Jan. 19, 1971     B. E. EAKIN ET AL     3,556,917
HONEYCOMB INSULATION PANEL FOR CRYOGENIC TEMPERATURES
Filed Feb. 14, 1966     2 Sheets-Sheet 1
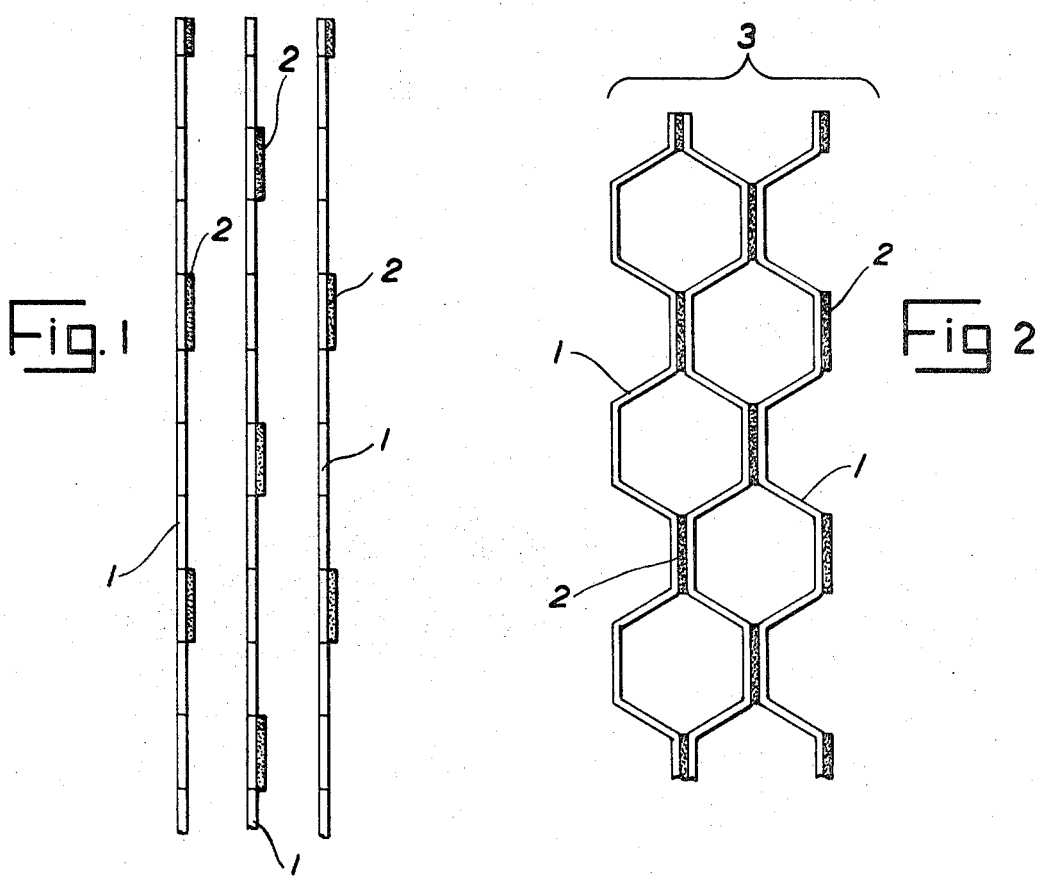
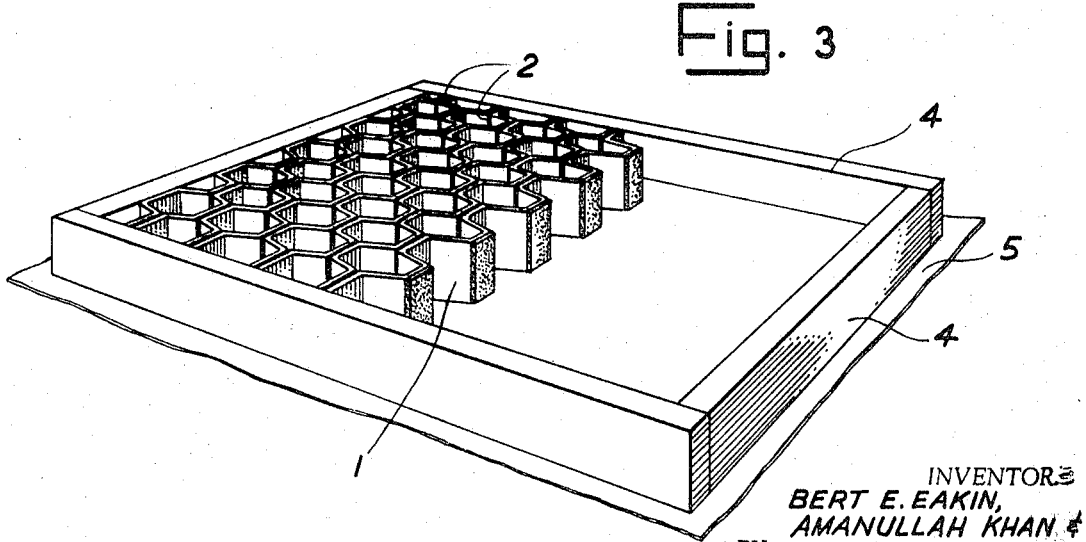
INVENTORS
BERT E. EAKIN,
AMANULLAH KHAN &
BY   PHILLIP J. ANDERSON
Bair, Freeman & Molinare
ATTORNEYS

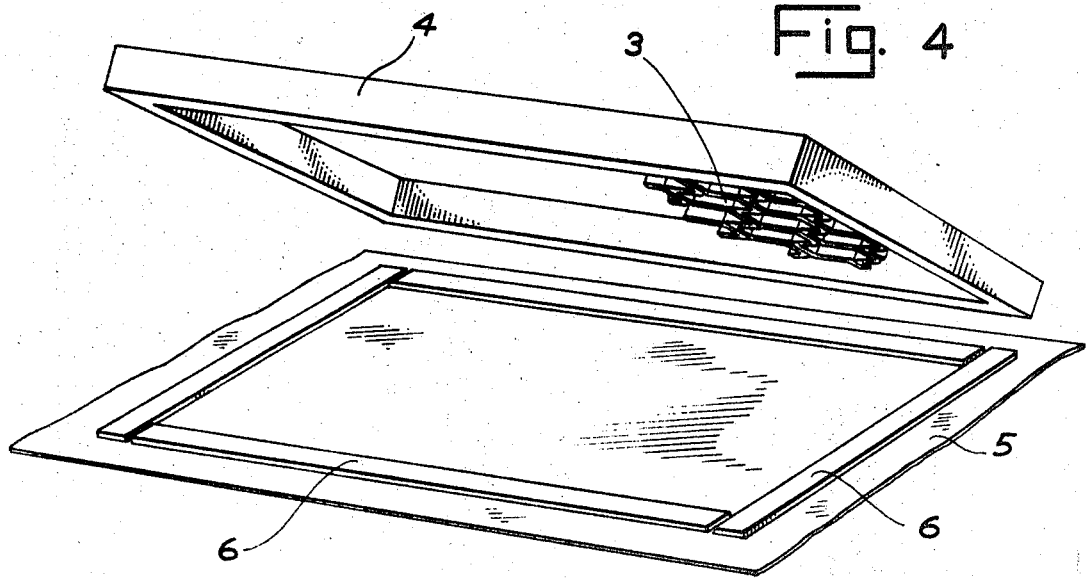
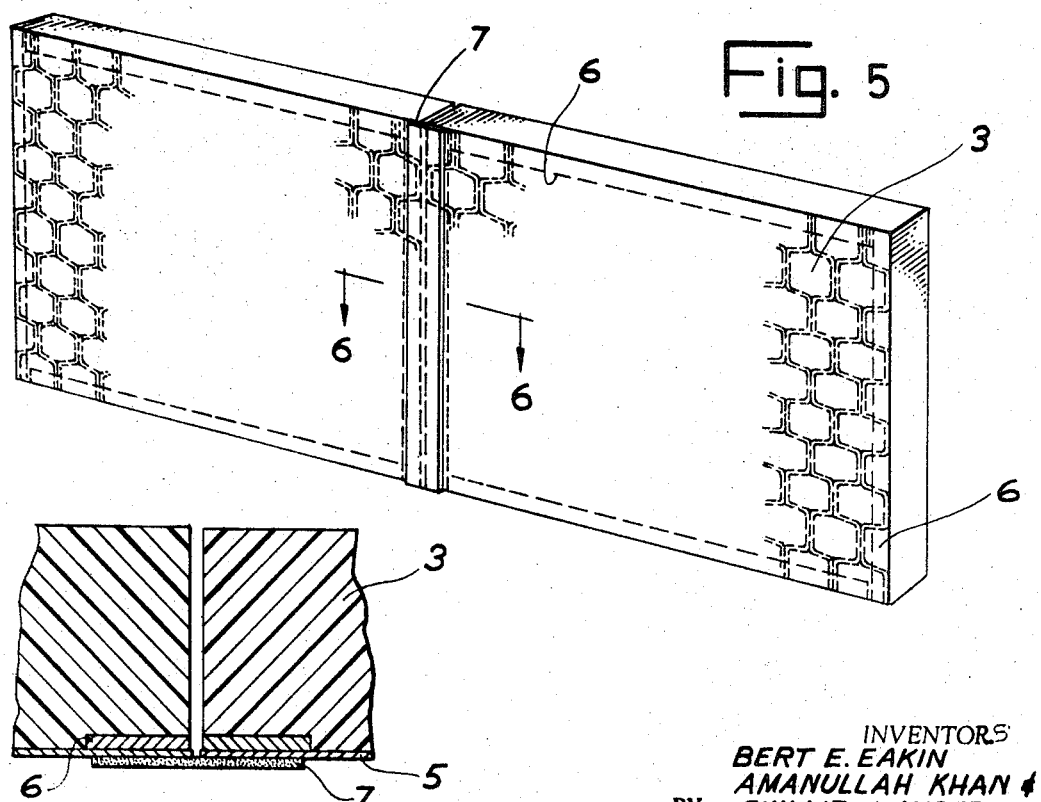
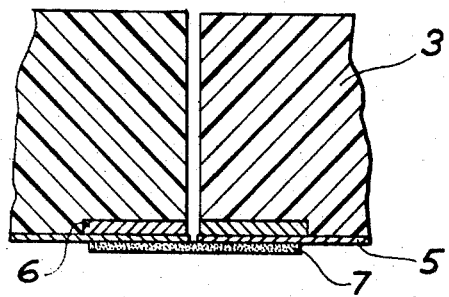

3,556,917
HONEYCOMB INSULATION PANEL FOR
CRYOGENIC TEMPERATURES
Bertram E. Eakin, Naperville, Amanullah R. Khan, Chicago, and Phillip J. Anderson, Deerfield, Ill., assignors, by mesne assignments, to American Gas Association, Inc., New York, N.Y., a membership corporation of New York
Filed Feb. 14, 1966, Ser. No. 527,228
Int. Cl. B32b 1/04, 3/02; D04h 1/02
U.S. Cl. 161—44                                      5 Claims

ABSTRACT OF THE DISCLOSURE

A composite insulating panel useful as insulation at cryogenic temperatures. The panel includes a skeletal structure of flexible polyurethane foam having relatively thin walls which form a plurality of adjacent hexagonal cells. Rigid polyurethane foam block is secured to the walls of and within each of the cells. A sheet of material covers and is secured to one face of the panel.

---

This invention relates to novel insulation means especially useful with storage systems for liquids at cryogenic temperatures. In particular, the invention relates to a novel insulating structure with temperature coefficient of expansion sufficient to prevent cracking when subjected to the drastic temperature changes encountered when storing and manipulating liquids at cryogenic temperatures.

Cryogenic liquids, such as liquid hydrogen, nitrogen, argon, carbon dioxide, methane, ethane, propane, or butane, present difficult storage problems in that the insulation used within a storage tank or container is subjected to large temperature changes when the tank is filled or emptied of its liquid content. For example, a storage tank operated at 1 atmosphere pressure will drop in temperature from ambient down to −434° F. upon being filled with liquid hydrogen. The insulation is thus subjected to thermal stresses which may crack the insulating material or displace it from the walls of the container and reduce its efficiency for further application.

Among present attempts to solve the problem of providing suitable insulating means is the use of small blocks which may be stacked against the inside walls of a container. The blocks being independent units can expand and contract under thermal stress. However, handling small blocks in this fashion is awkward and they do not lend themselves to making permanent structures. It has also been proposed to use large sheets of foam material or to spray foam material on the inside walls of a liquid-holding container. However, known sheet foam materials crack under the thermal stresses involved in storing cryogenic liquids, and the cracked material is rendered less efficient as good insulation.

It is thus an object of this invention to provide an insulating structure and material for use at cryogenic temperatures which will respond to thermal stresses without rupturing or cracking.

It is another object of this invention to provide an insulation which is sufficiently flexible in two dimensions so as to prevent build-up of destructive stresses due to thermal contraction or expansion caused by temperature changes when the insulation is restrained rigidly to the walls, while at the same time providing an insulation sufficiently rigid in the third dimension so that hydrostatic loads due to the stored liquid plus gas pressure loads (in excess of one atmosphere) will be transmitted to the container walls without crushing the insulation.

Other objects of the invention will become apparent as the invention is more fully described hereinafter.

In the drawings:
FIG. 1 shows sheets of flexible foam prior to assembly into the skeletal structure of the invention;
FIG. 2 shows the assembled skeletal structure of the insulating material of the invention;
FIG. 3 is a perspective view showing a partially completed panel of insulating material of the invention;
FIG. 4 is a perspective view illustrating one embodiment of the process for making the insulating structure of the invention;
FIG. 5 is a perspective view showing two completed and connected panels of the insulating material of the invention; and
FIG. 6 is a view along lines 6—6 of FIG. 5.

The insulating structure of our invention is essentially a composite of rigid and flexible foams, such as polyurethane or polyvinylchloride, arranged in a honeycomb configuration to provide a structure which is transversely rigid but free to expand and contract in the other directions in response to thermal stresses. The honeycomb skeleton of our composite insulation material is made as represented in FIGS. 1 and 2. A plurality of sheets of flexible plastic foam 1, such as polyurethane, are joined together by adhesive which is placed in alternating strips 2 along the foam plastic sheet as shown in FIG. 1. Any suitable adhesive, well known in the art, for joining flexible polyurethane foam may be used. The plastic sheets are then extended as shown in FIG. 2 to form a honeycomb skeleton of hollow hexagonal chambers shown generally at 3. It should be clear that by changing the relationship of the adhesive, other hollow shapes can be created, as desired.

Honeycomb skeleton 3 is then placed inside a frame which will support the skeleton in the configuration desired for a finished panel of insulating material. For example, FIG. 3 shows a rectangular frame, 4, made for example of wood planks secured at their ends by nails or screws. It should be clear that the shape of the frame may be rectangular, square, triangular or any other desired shape for the finished insulating panel. Skeleton 3 is placed inside the frame and is freely confined within it. Alternatively, the inside of the frame may be lined with flexible foam material (not shown) and the abutting edges of the skeleton may be secured to the foam liner by suitable adhesive.

As shown in FIG. 3, honeycomb skeleton 3, confined inside frame 4, is placed atop a sheet of plastometallic liner, for example aluminum foil coated with polyvinyl acetate. The structure is then ready for filling with material such as rigid polyurethane foam by in situ foaming, a technique well known in the art, to provide a plurality of rigid foam blocks in each cell unit. It is not necessary that skeleton 3 be secured by adhesives or otherwise to liner 5 since the subsequent foaming will bond the liner to the rigid foam which in turn is bonded to the walls of skeleton 3.

The individual cells may be filled one at a time or they may be filled simultaneously. If filled one at a time, it is desirable to support the walls surrounding the individual cell to be filled to insure that the cell maintains a generally regular shape during foaming. Otherwise, the foam if it develops and spreads unevenly, may push the cell walls out of shape. The walls may be supported by metal or wood strips (not shown), which are placed temporarily against the backside of each cell wall which is being filled. After foaming, these strips are removed. As each cell is filled, its walls then serve as a rigid back-up for the next adjacent cells. If all cells are foamed simultaneously, supporting strips are not needed since the walls of each cell provide mutual support as foaming occurs in each cell.

After foaming is complete, frame 4 is removed, and the overlapping edges of the plastometallic liner 5 may be trimmed or simply folded over the edges of the panel. This provides a generally rectangular shaped panel ready for use as one unit in an insulating wall structure. Individual panels may be joined together by tape or adhesive as described more fully hereinafter.

In a preferred embodiment of the invention, shown in FIGS. 4, 5 and 6, there are provided four back-up strips 6 which are secured by suitable adhesive to liner 5 and arranged so that their outside edges abut the inside edge of frame 4 when the frame is lowered onto the liner as shown in FIG. 3. These back-up strips may be, for example, 1/8 inch Masonite and provide a smooth flat surface under liner 5 and along the perimeter of the finished panel (as shown in FIG. 5) so that the panels may readily be secured to one another by means of adhesive tape 7. Tape 7 is placed as shown in FIGS. 5 and 6 to overlap two adjoining panels and be secured to that portion of liner 5 which is backed up by strips (FIG. 6). In this way, the tape is provided with a smooth flat surface for good adhesion. If back-up strips 6 are not used, the edge of the panels is often of insufficient regularity in surface flatness to provide good tape adhesion.

As hereinabove explained, the composite insulating panels of our invention are particularly adapted for use with storing cryogenic liquids. The percent elongation required of the flexible honeycomb walls over the temperature ranges to be encountered depends upon the relative thickness of the walls and the width of the cells. Flexible polyurethane foam is an example of a usable wall material since its flexible expansion in the useful temperature ranges for storing cryogenic materials is adequate to prevent splitting and rupturing of the cell walls. For example, at room temperature, flexible polyurethane may be elongated about 200 percent without rupturing, while at $-320°$ F., the percent elongation at rupture is in excess of 50%. The temperature coefficient of expansion of solid foam polyurethane is $3.5 \times 10^{-5}$ inches per inch per degree F. The following table shows the relationship of wall thickness and cell size to percent elongation of the flexible wall for cooling from ambient to $-320°$ F. when the edges of the panel surface are constrained while cooling.

TABLE I

| Thickness of flexible foam honeycomb walls, inches | Size of individual cells (measured across cell), inches | Percent elongation of flexible foam |
|---|---|---|
| 1/8 | 6 | 54 |
| 1/8 | 3 | 27 |
| 1/8 | 2 | 18 |
| 1/8 | 1 | 9 |
| 1/4 | 6 | 27 |
| 1/4 | 3 | 14 |
| 1/4 | 2 | 9 |
| 1/4 | 1 | 5 |

As can be seen from the table, if a 6-inch cell is used, a 1/8-inch wall thickness is insufficient to provide the proper expansion at the calculated temperature drop, assuming a maximum percent of up to 50% for elongation at the lower temperature. Those skilled in the art can recognize from the table that knowing the coefficient of expansion of rigid polyurethane foam, the percent elongation of flexible urethane foam at varying temperatures and the temperature drop involved, one can calculate the specific wall thickness required for any particular cell size. The values shown in the table are but illustrative of typical cell sizes and wall thicknesses at one illustrative temperature drop.

The composite insulating panels described hereinabove are particularly useful in storing containers or chambers having regularly shaped flat walls in which the panels can be preformed to the shape of the walls and attached with a suitable adhesive. If the wall surfaces are irregular, the panels may be supported in place and the space between the wall and panels filled by a foamed-in-place process. For example, urethane foam bonds well to both concrete and rock in addition to other urethane surfaces. It should be noted that this method of construction of insulation panels can readily be adapted to a continuous process, and is not limited to that described as an illustration of the technique.

It is also understood that materials other than flexible and rigid polyurethane can be used satisfactorily for the panel structure. For example, thermosetting and thermoplastic polymers and copolymers, naturally occuring polymers and inorganic polymers can be used.

Those skilled in the art will recognize that various modifications may be made within the scope of our invention which we intend to be limited solely by the following claims.

We claim:

1. A composite insulating panel useful as insulation at cryogenic temperatures, said panel comprising a skeletal structure of flexible polyurethane foam having relatively thin walls which form a plurality of adjacent cells, a rigid polyurethane foam block secured to the walls of and within each of said cells, and a sheet of plastometallic material covering and secured to one face of said panel.

2. The panel of claim 1 wherein said cells are hexagonal in shape.

3. The panel of claim 1 wherein said plastometallic liner comprises aluminum foil coated with polyvinyl acetate.

4. The panel of claim 1 wherein back up strips are adhesively secured to the perimeter of said panel, said back up strips being provided for receiving an adhesive strip for securement to an adjacent panel.

5. A composite insulating panel useful as insulation at cryogenic temperatures comprising a skeletal structure of flexible polyurethane foam having relatively thin walls which form a plurality of adjacent hexagonal cells, a rigid polyurethane foam block secured to the walls of and within each cell, a sheet of plastometallic material covering and secured to one face of said panel, said plastometallic material being backed up around the perimeter of said panel by a plurality of thin relatively hard strips which are secured to said liner between the liner and the panel, said strips providing smooth relatively hard surfaces on one face of said panel.

References Cited

UNITED STATES PATENTS

| | | | |
|---|---|---|---|
| 2,061,569 | 11/1936 | Fischer | 161—160X |
| 2,660,194 | 11/1953 | Hoffman | 161—Porous Block Dig. |
| 2,744,042 | 5/1956 | Pace | 161—68UX |
| 3,130,112 | 4/1964 | Anderson | 161—89 |
| 3,255,062 | 6/1966 | Wilkins | 161—68X |
| 3,301,732 | 1/1967 | Kunz | 156—267X |
| 3,317,074 | 5/1967 | Barker et al. | 220—9 |
| 3,367,492 | 2/1968 | Pratt et al. | 220—9 |

FOREIGN PATENTS

| 860,818 | 2/1961 | Great Britain | 161—68 |

ROBERT F. BURNETT, Primary Examiner

W. A. POWELL, Assistant Examiner

U.S. Cl. X.R.

156—79, 197; 161—43, 68, 104, 160; 220—9; 264—45